(12) United States Patent
Gass

(10) Patent No.: US 8,859,024 B2
(45) Date of Patent: Oct. 14, 2014

(54) SEPARATABLE SHELL FOR RECEIVING CANDY COATING AND STORING TOY

(75) Inventor: Kevin M. Gass, New York, NY (US)

(73) Assignee: Candy Treasure, LLC, Lebanon, NJ (US)

( * ) Notice: Subject to any disclaimer, the term of this patent is extended or adjusted under 35 U.S.C. 154(b) by 432 days.

(21) Appl. No.: 12/775,298

(22) Filed: May 6, 2010

(65) Prior Publication Data

US 2011/0123687 A1    May 26, 2011

Related U.S. Application Data

(60) Provisional application No. 61/263,348, filed on Nov. 21, 2009.

(51) Int. Cl.
| | |
|---|---|
| *A23G 3/56* | (2006.01) |
| *B65D 65/46* | (2006.01) |
| *B65D 6/24* | (2006.01) |
| *A23G 1/50* | (2006.01) |

(52) U.S. Cl.
CPC ............. *B65D 65/463* (2013.01); *A23G 1/505* (2013.01); *A23G 3/563* (2013.01); *B65D 11/188* (2013.01)
USPC ............... 426/90; 426/89; 426/104; 426/132; 426/138

(58) Field of Classification Search
CPC ......... A23G 1/505; A23G 3/50; A23G 3/563; A23G 3/545
USPC ............. 426/90, 89, 104, 132, 138; 220/4.25, 220/4.24; 446/386
See application file for complete search history.

(56) References Cited

U.S. PATENT DOCUMENTS

| | | | | |
|---|---|---|---|---|
| 2,784,512 | A * | 3/1957 | Goodwin | 428/8 |
| 3,292,840 | A | 12/1966 | Schmidt | |
| 4,106,657 | A * | 8/1978 | Dogliotti | 220/23.4 |
| 4,124,135 | A | 11/1978 | Weder et al. | |
| 5,287,979 | A * | 2/1994 | Bourgeois | 220/4.21 |
| 5,728,414 | A | 3/1998 | Terrasi | |
| 5,792,496 | A * | 8/1998 | Fekete et al. | 426/104 |
| 5,925,391 | A | 7/1999 | Whetstone, Jr. | |
| 6,050,438 | A * | 4/2000 | Kovens et al. | 220/4.24 |
| 6,099,872 | A | 8/2000 | Whetstone, Jr. | |
| 7,871,651 | B2 * | 1/2011 | Sinichko et al. | 426/104 |
| 2001/0005520 | A1 * | 6/2001 | Costantini | 426/104 |

FOREIGN PATENT DOCUMENTS

EP    1 308 392 A1    7/2003

* cited by examiner

*Primary Examiner* — Drew Becker
*Assistant Examiner* — Luana Z Long
(74) *Attorney, Agent, or Firm* — Flachsbart & Greenspoon, LLC

(57) ABSTRACT

A container has first and second sections with an opening into hollow interiors. They mate together to form a sealed enclosure, and to form a ridge having a cross-sectionally curved outer surface. An appendage is connected to the ridge including an aperture for receiving a hook. A coating of edible material is on the outer surface of at least a portion of at least one of the first and second sections. An external flange extends around the periphery of the opening of the first section, an internal flange extends around the periphery of the opening of the second section, wherein the internal flange is sized to contact and fit inside the external flange during mating. An aperture passes through the internal flange, wherein mating the first and second sections causes the external flange to cover and seal the internal flange aperture.

15 Claims, 10 Drawing Sheets

SEPARATABLE SHELL FOR RECEIVING CANDY COATING AND STORING TOY

CROSS-REFERENCE TO RELATED APPLICATION

This non-provisional patent application claims priority and benefit of U.S. provisional patent application having application No. 61/263,348, filed Nov. 21, 2009, and entitled SEPARABLE SHELL FOR RECEIVING CANDY COATING AND STORING TOY, the disclosure of which is hereby incorporated by reference in its entirety.

FIELD OF THE INVENTION

The present invention relates generally to children's toys, and more particularly, to containers for storing children's toys having an edible coating.

BACKGROUND OF THE PRESENT INVENTION

Children's toys and candies come in numerous shapes and sizes, and competition among vendors to attract consumers to buy their particular toys and candies is fierce. One technique utilized by candy and toy vendors is to enclose small toys within food or candy packaging. Breakfast cereals and packaged snacks, such as Cracker Jack®, provide well-known and common examples of enclosing small toys within food products.

Other examples enclosing small toys inside hollow containers are disclosed in U.S. Pat. Nos. 3,292,840; 4,124,135; 5,728,414; 5,925,391; 6,099,872, all of which are hereby incorporated by reference in their entirety. For example, U.S. Pat. No. 4,124,135, issued to Weber et al., discloses a hollow, plastic hinged Easter egg for containing candy or small toys. U.S. Pat. No. 5,728,414, issued to Terrasi, discloses a food product package having two half shells that fit together to form a hollow egg that encloses a toy in one shell and candy in the other shell. U.S. Pat. Nos. 5,925,391 and 6,099,872, issued to Whetstone, disclose a non-edible product shaped like a hollow egg for storing a small toy, the egg covered by an edible coating. These patents further disclose a radially, outwardly extending rib having opposing side edges and an outer edge that encircles the surface of the egg.

The Food and Drug Administration (FDA) regulates the edible portion of confectionery novelty products, and the Consumer Product Safety Commission (CPSC) regulates the toys contained inside or in proximity to such products. Both the FDA and CPSC have taken a position that if toys and containers containing toys are formed to a confection or encased within a confection, both the toys and any container containing said toys need to be safe for children of all ages. The CPSC rulings require that all non-edible materials in toys must comply with the requirements for small parts (16 C.F.R. Part 1501) and the guidelines for sharp points (16 C.F.R. §1500.48). Furthermore, §402(d)(1) of the Federal Food, Drug and Cosmetic Act requires that toy-containing products must not be embedded in a candy coating:

> A food shall be deemed to be adulterated—If it is confectionery, and has partially or completely imbedded therein any nonnutritive object, except that this subparagraph shah not apply in the case of any nonnutritive object if, in the judgment of the Secretary as provided by regulations, such object is of practical functional value to the confectionery product and would not render the product injurious or hazardous to health.

One method of preventing a toy container from being embedded in the candy is to provide a ridge that encircles the toy container and separates two candy coating areas, wherein the ridge is not covered by the candy coating. Such a ridge, as taught in U.S. Pat. No. 5,925,391, has right-angle edges which tend to rip foil wrapper covering the candy with typical variations in manufacturing or storage. The sharp cornered ridge may also scratch the skin or eye of a small child when the ridge is exposed from the candy coating.

Accordingly, there is a need for a candy-coated toy container designed so as not to be embedded when coated with candy, and further, provides clear notice to a child that there is non-edible material below the candy coating. Additionally, there is a need to design a candy-coated container providing additional safety features.

OBJECTS AND SUMMARY OF THE INVENTION

In view of the foregoing, an object of the present invention is to provide a container for a small toy that can be coated in food or candy without being embedded and provides clear notice to a child that non-edible material is located below the edible coating.

Another object of the present invention is to provide a container for a small toy having a ridge or lip that prevents the edible coating from embedding or completely covering the toy container so as to ensure a child is provided clear notice that non-edible material is below the edible coating.

An additional object of the present invention is to provide a container having a ridge on the surface of the container with an outer curved surface to prevent cutting, puncturing or scraping the outer candy wrapper or the skin or eye of a child.

Another object of the present invention is to provide a container for a small toy having a ridge that extends beyond the outer surface of the container so as to meet CPSC child safety guidelines. Moreover, the ridge increases the external diameter of the container, thus providing an additional measure to prevent the container from being swallowed by a child. Furthermore, by providing the ridge to increase the external diameter instead of the container housing alone as the external diameter, the actual capsule can be smaller and require less formation materials and surrounding chocolate, while still conforming to the CPSC guidelines.

An additional object of the present invention is to provide a ridge extends beyond the surface of the container or has a configuration to prevent a candy coating from covering the ridge.

A further object of the present invention is to provide an apparatus for hanging a toy container having an edible coating, such as on a Christmas tree.

An even further object of the present invention is to provide a container for a small toy that is difficult for a very small child to open without the assistance of an adult.

Another object of the present invention is to provide a candy-coated toy container that complies with all government safety requirements.

Another object of the present invention is to provide air holes in the container to prevent suffocation of a child, since the air holes prevent an airtight seal from being formed between the container and the mouth of a child.

An additional object of the present invention is to provide a container having a rounded ridge on the surface of the container. The rounded ridge functions to separate sections of the edible coating, and further, keep the edible food or candy coating sections separated in the event the coating melts or flows around the capsule under imperfect storage conditions.

The rounded ridge functions to keep the edible coating from covering the toy container, helps direct any unintended flow away from the capsule, and ensures a child is provided clear notice that non-edible material is below the edible coating, even when the product is improperly stored under sub-optimal, but common, temperature conditions.

Another object of the present invention is to provide a container having a ridge on the surface of the container with an outer curved surface wherein the ridge provides clear separation of two covering food or candy pieces while reducing surface contact on the ridge with the food or candy coating, decreasing potential bonding between the two edible and inedible materials, and allowing for easier separation of the edible and inedible pieces.

In accordance with the present invention, a container is provided having a first section with an opening into a hollow interior, a second section having an opening into a hollow interior, said first and second sections configured to mate together at their respective openings to form a sealed enclosure, and a ridge extending along on the outer surface of at least one of the first and second sections, said ridge having a curved outer surface. An appendage is connected to the ridge for including an aperture for receiving a hook. A coating of edible material is on at least a portion of the outer surface of the first section and second sections. An aperture is located in the first section to provide an air passage from the outer surface into the hollow interior of the first section. An external flange extends around the periphery of the opening of the first section, an internal flange extends around the periphery of the opening of the second section, wherein the internal flange is sized to contact and fit inside the external flange during mating of the first and second sections to form a sealed container, and an aperture passes through the internal flange, wherein mating of the first and second sections cause the external flange to cover and seal the internal flange aperture. In another embodiment the ridge has a T-shaped or mushroom-shaped cross-section to aid in preventing a coating on the outer surface of the first and second sections from crossing over the ridge.

DETAILED DESCRIPTION OF THE PREFERRED EMBODIMENTS

Figure 1:
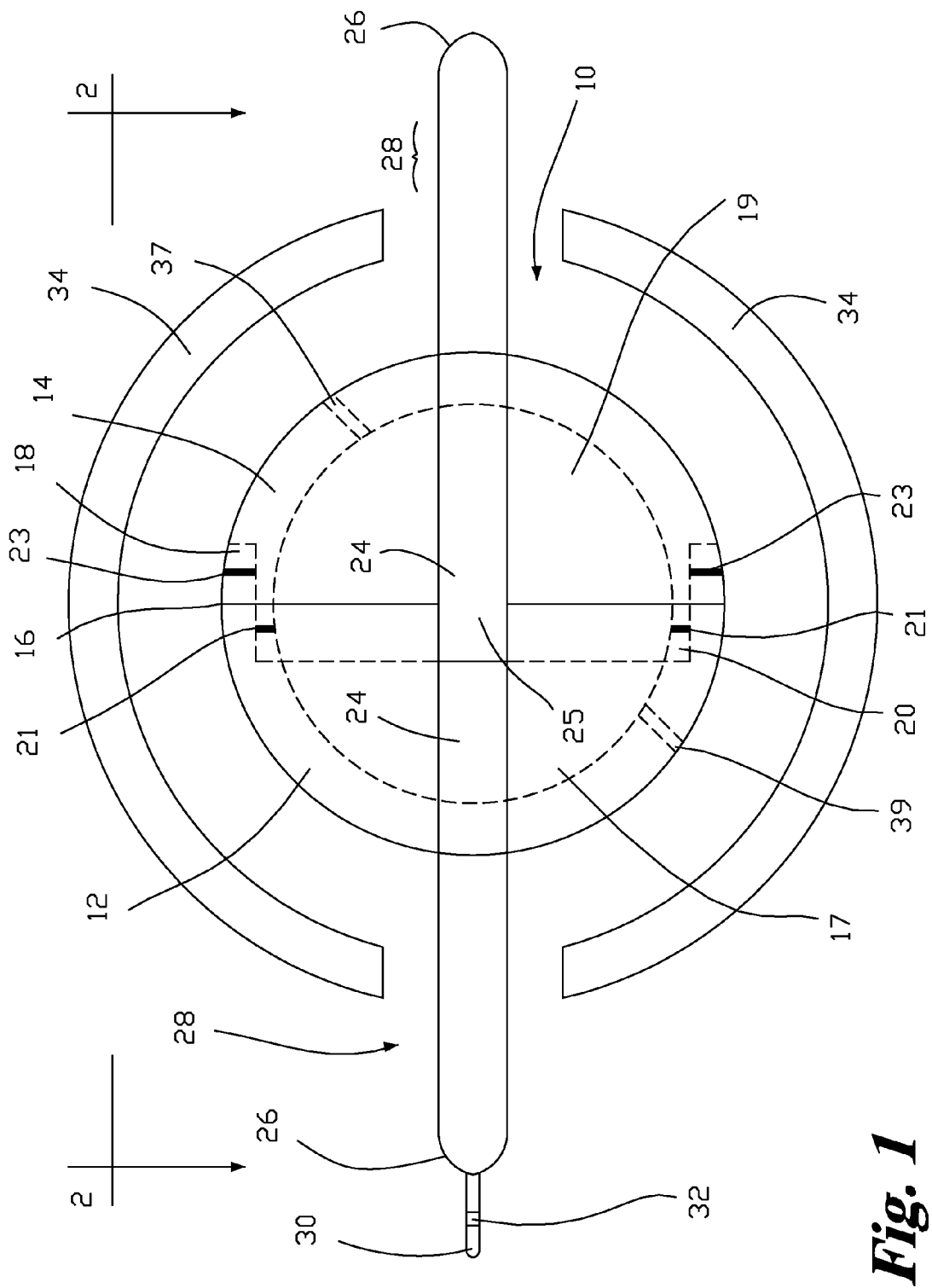
FIG. 1 is a cross-sectional view of a preferred embodiment of the present invention shown in and taken along line 1-1 of FIG. 2.

Referring now to the drawings, FIG. 1 illustrates a cross-sectional view of a container 10 configured in accordance with the present invention. The illustrated container 10 has a spherical configuration, but the container 10 may be any configuration, including a box, an oval, or the shape of a figure, such as Santa Clause or the Easter bunny. A first section 12 and a second section 14 are shown connected at a joint 16 to form a sealed container 10.

Figure 1A:
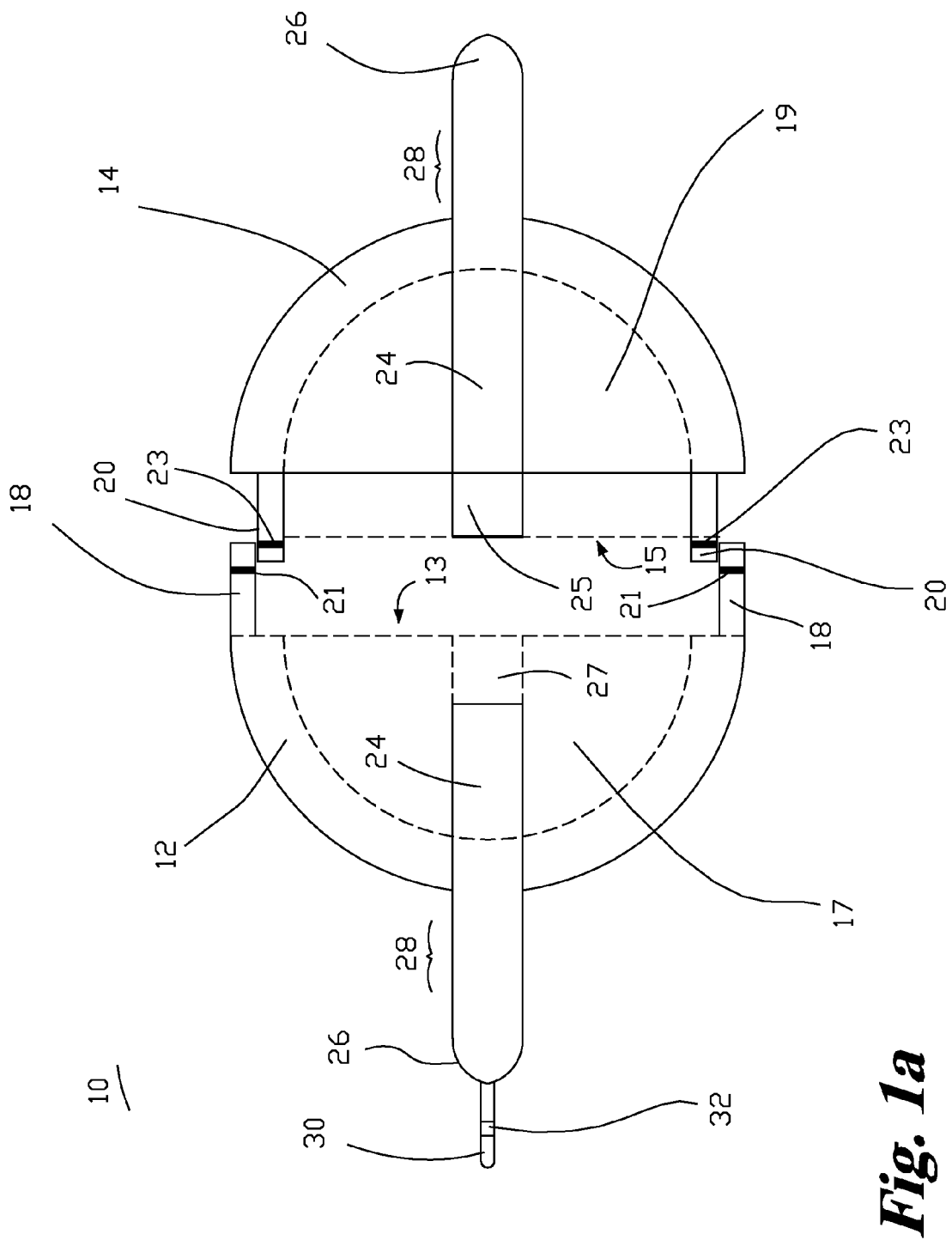
FIG. 1a is the cross-sectional view of the container shown in FIG. 1, wherein the two sections of the container have been separated to open the container.

FIG. 1a shows sections 12 and 14 being separated from the joint 16 formed by joining the openings 13 and 15 of the section 12 and 14, respectively. The openings 13 and 15 provide access to the hollow interiors 17 and 19 of sections 12 and 14, respectively. The periphery of opening 13 of section 12 includes an external flange 18. The periphery of opening 15 includes an internal flange 20. The internal flange 20 fits inside and mates with external flange 18 to form the sealed joint 16. The external flange 18 includes at least one aperture 21 allowing air to pass through the external flange 18. Similarly, internal flange 20 includes at least one aperture 23 allowing air to pass through the internal flange 20. The apertures 21 and 23 in the external flange 18 and internal flange 20, respectively, function to prevent suffocation of a child, since the air holes do not allow an airtight seal to be formed between a first or second section 12,14 of the container 10 and the mouth of a child. Similarly, apertures 37 and 39 shown in FIG. 1 are located in sections 14 and 12, respectively, to prevent the formation of an airtight seal between the first or second section 12,14 and the mouth of a child. In accordance with the present invention, however, the apertures 21,23 are sealed when the openings 13,15 are connected completely together to form the joint 16. Apertures 37 and 39 are sealed when the edible coating is placed on the outer surface of the sections 12 and 14.

Referring to FIGS. 1 and 1a, a ridge 24 is located on the surface of the first and second sections 12,14 which extends around the center or the equator of the container 10. In the illustrated embodiment, the ridge 24 extends perpendicular to the formed joint 16. In other embodiments, the ridge 24 can extend parallel or diagonal to the joint 16. The ridge 24 includes a curved outer surface 26. In accordance with the present invention, an extension area 28 positions the curved outer surface 26 beyond the outer surface of the first and second sections 12,14. The ridge 24 includes a tab or appendage 30 having an aperture 32 for receiving a hook for hanging the container 10 as an ornament, such as on a Christmas tree. The ridge 24 includes a post 25 on the first section and slot 27 (not shown) on the second section at each of the respective openings. The post 25 and slot 27 (not shown) on the ridge 24 fit together to align to the ridge 24 during the joining of sections 12 and 14 to form joint 16 as shown in FIG. 1.

FIG. 1 further illustrates the edible layer or coating 34, such as chocolate, in an exploded view from the container 10. The edible layer 34 covers the outer surface of the first and second sections 12,14. In accordance with the present invention, an extended area 28 of the ridge 24 keeps the curved outer surface 26 of the ridge 24 beyond the outer surface of the edible coating 34. In this manner, the ridge 24 functions to keep the container 10 from being embedded in the edible coating 34, and the ridge 24 further functions to clearly provide notice to a child that non-edible material is located below the edible coating 34. The extended area 28 functions to assist in preventing curved outer surface 26 of the ridge 24 from being covered by the edible coating 34 by locating the curved outer surface 26 of the ridge 24 beyond the outer surface of the sections 12,14. The extended area 28 is shown extending the curved outer surface 26 of the ridge 24 out substantially beyond the outer surface of the edible coating 34. However, in other embodiments, the extended area 28 does not extend the curved outer surface 26 of the ridge 24 significantly beyond the outer surface of the edible coating 34. Moreover, in other embodiments of the present invention the curved outer surface 26 can be level or even below the outer surface of the edible coating 34.

Figure 2:
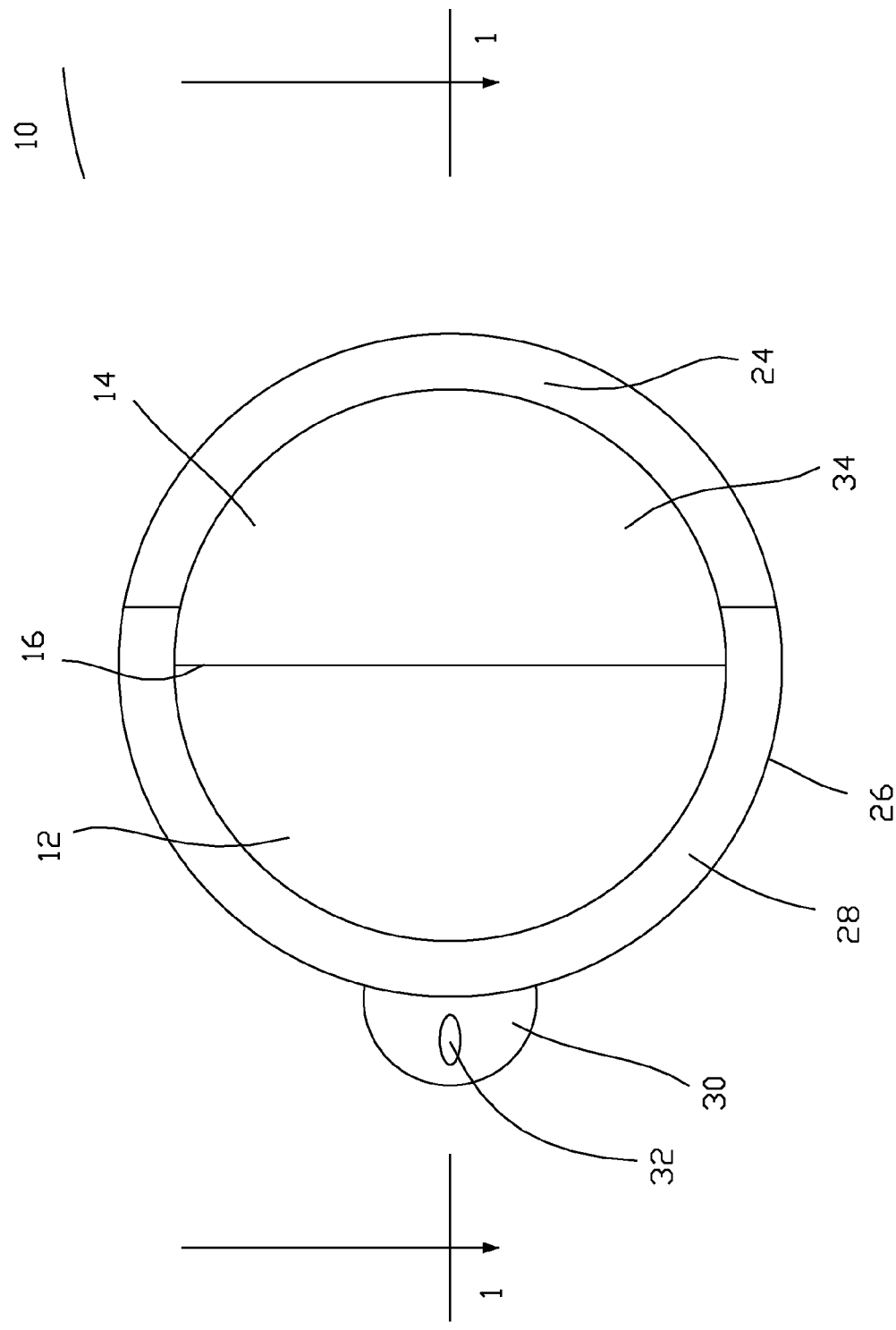
FIG. 2 is a top view of the present invention shown in and taken along line 2-2 of FIG. 1.

FIG. 2 illustrates a view of the container 10 shown in and taken along line 2-2 of FIG. 1. FIG. 2 shows the outer surfaces of sections 12 and 14, whose openings 13 and 15 are connected to form sealed joint 16. The ridge 24 is shown surrounding the outer surface of sections 12,14 along the center or equator of the container 10. An edible coating 34 covers the outer surface of the first and second sections 12,14. The extension or extended area 28 and outer curved surface 26 of the ridge 24 also are illustrated. The tab 30 on the ridge 24 having an aperture 32 for receiving a hanging hook is shown.

The container 10 is preferably constructed of a lightweight rigid material, such a plastic, but may be constructed of a lightweight metal or even wood. The edible coating 34 is preferably chocolate that is placed on the outer surface of the first and second sections 12,14 after being molded to cover the first and second section 12,14. However, the edible material may be any type of candy or food that may be formed to fit on the outer surface of the first and second sections 12,14.

Figure 3:
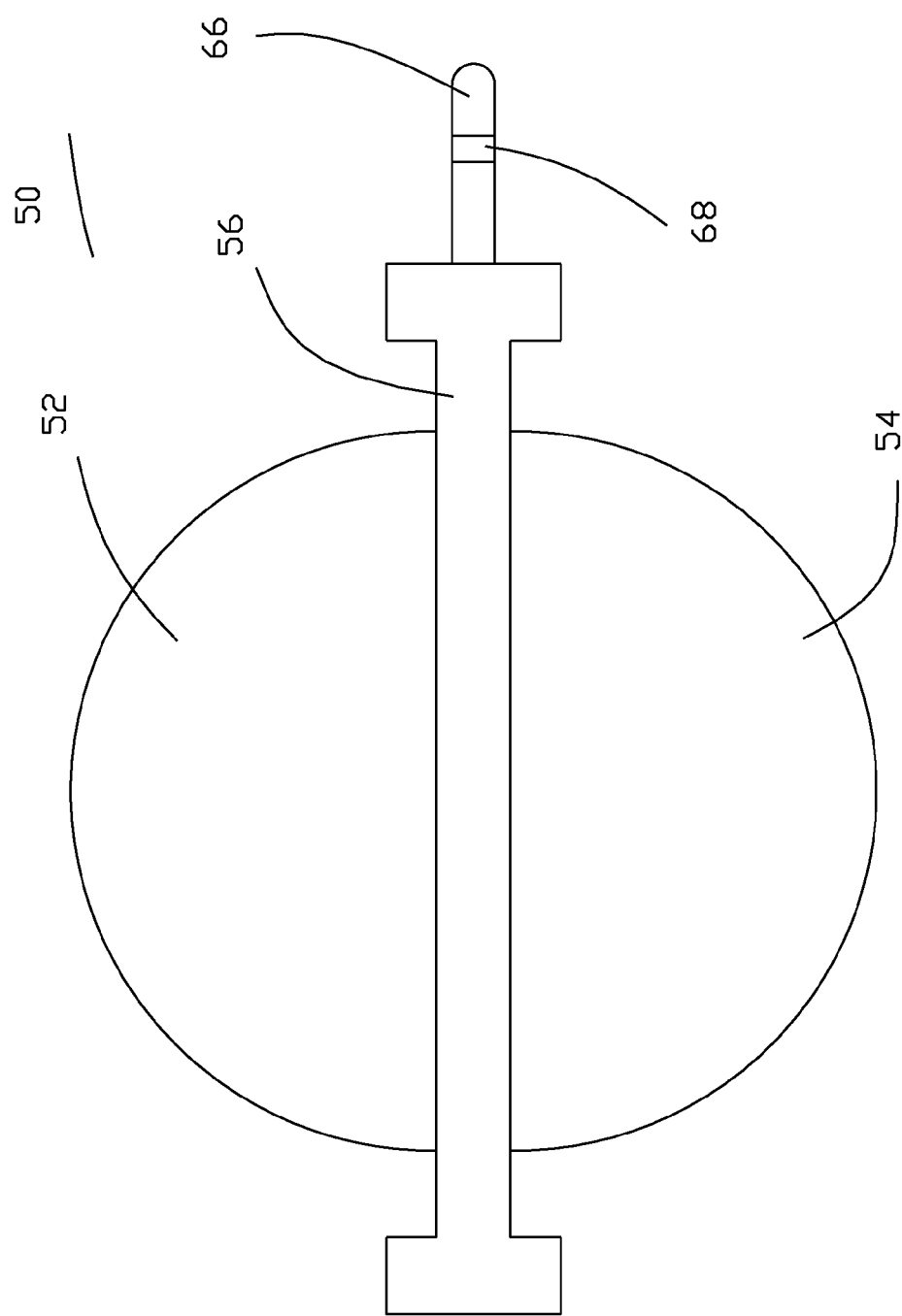
FIG. 3 is a side view of another embodiment configured in accordance with the present invention.
Figure 3A:
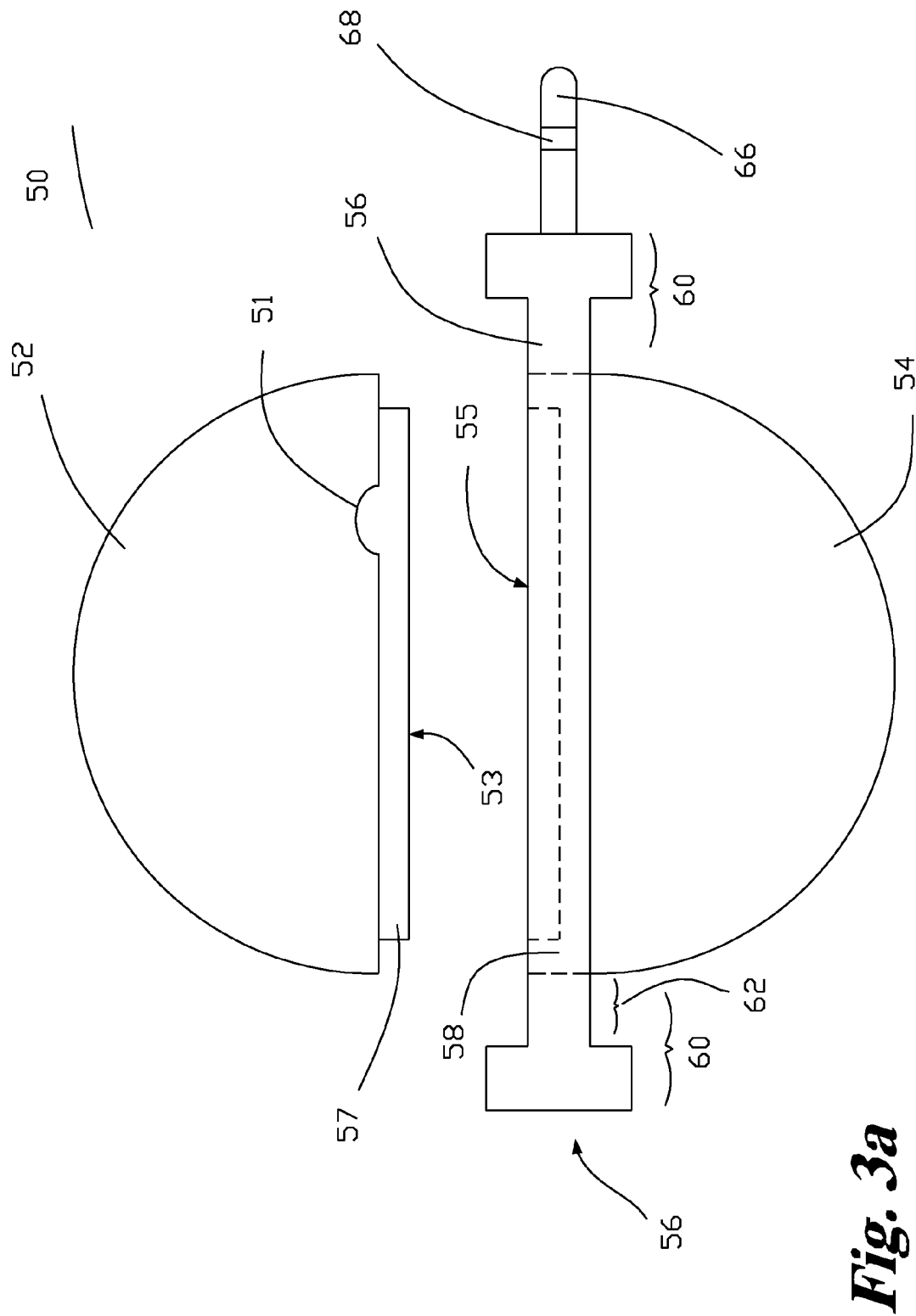
FIG. 3a is side view of the embodiment shown in FIG. 3a, wherein the sections of the container have been separated to open the container.

FIGS. 3 and 3a illustrate another embodiment of the present invention wherein a container 50 has a first section 52 and a second section 54, each having hollow interiors, that are joined together to form a sealed container 50. A ridge 56 extends around the outer surface of the second section 54 along the periphery of the opening 55 to the hollow interior of the second section 54. Of course, the ridge 56 could be located on the periphery of the opening 53 to the hollow interior of the first section 52 just as easily.

FIG. 3a shows the sections 52 and 54 from FIG. 3 being separated to open the container 50. Similar to FIG. 1, an internal flange 57 is located on the periphery of the opening 53 of the first section 52, and an external flange 58 is located on the periphery of the opening 55 of the second section. The internal flange 57 fits into and mates with the external flange 58 when the openings 53,55 come completely together to form a sealed container. A tab 66 having an aperture 68 for receiving a hook is connected to the ridge 56. A notch 51 for a parent's finger nail can be included in the periphery of the opening 53 to facilitate separating the first and second sections 52,54 in order to open the container 50.

In accordance with the present invention, the ridge 56 has a T-shaped cross-section 60. An edible coating located on the outer surface of the first and second sections 52,54 should not go beyond the extended area 62, or the "stem" of the T. The T shape functions to make it more unlikely for an edible coating covering the outer surfaces of the first and second sections 52,54 to come together and cover the ridge 56 by having to go up, over, and around the T-shaped ridge. Furthermore, and in accordance with the present invention, the top of the T provides a wider band that the stem of the T, thus providing additional notice to a child that non-edible material is located below an edible coating covering the outer surface of the first and second sections 52,54. In the preferred embodiment, the candy coating only rises to the stem of the T, and thus falls below the top of the T, providing a raised maker above the surface of the candy coating indicating a non-edible material below the candy coating.

Figure 4:
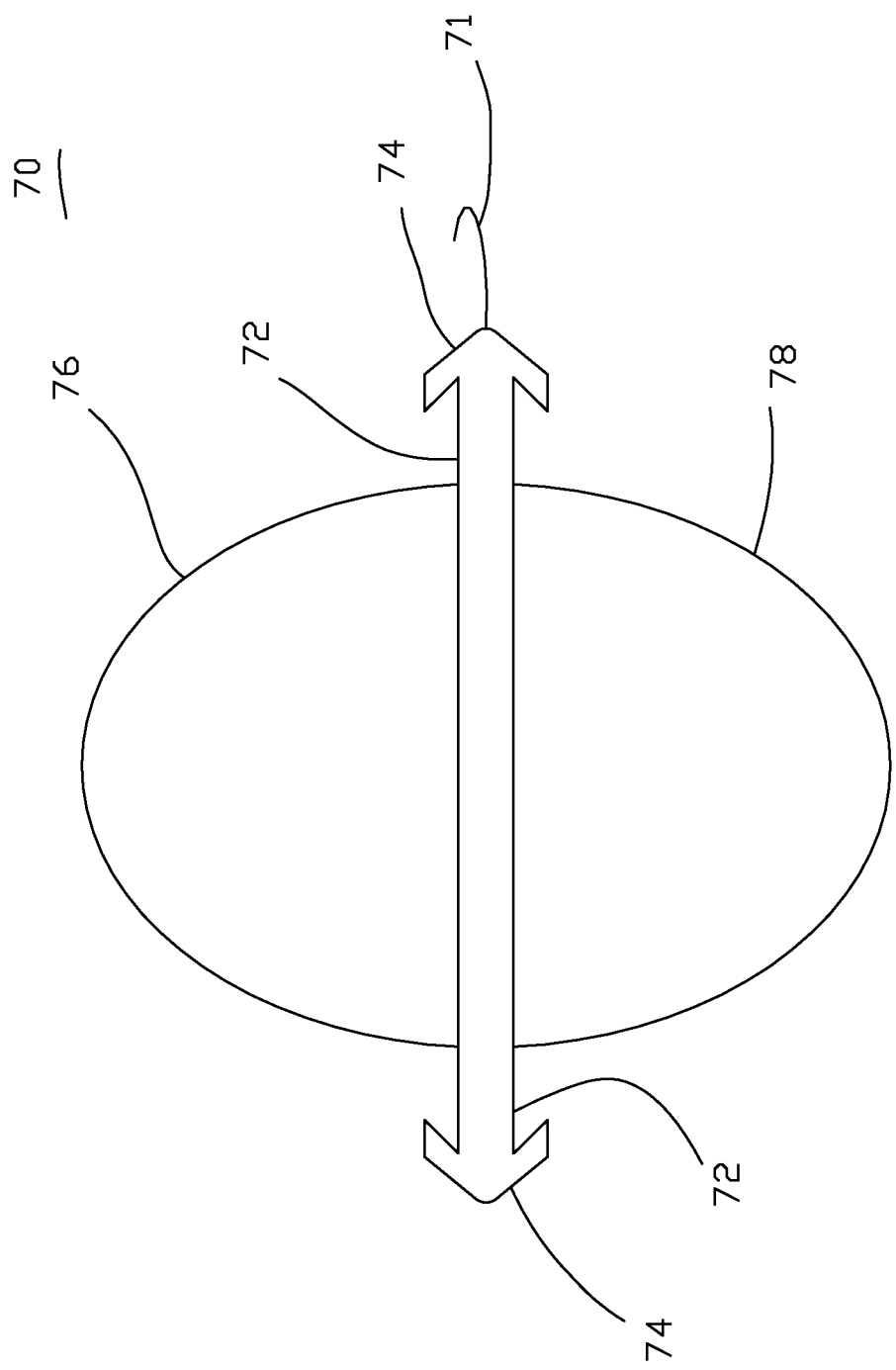
FIG. 4 is a cross-sectional view of a container configured in accordance with another embodiment of the present invention.

FIG. 4 illustrates a cross-section of a container 70 having a ridge 72. The ridge 72 has an outer surface 74 having a mushroom-shaped cross-section. In accordance with the present invention, the ridge 72 provides even further notice to a child that non-edible material is located below an edible coating covering the outer surface of first and second sections 76,78. The mushroom-shaped outer surface 74 makes it even more unlikely for an edible coating to come up, over, and across the mushroomed-shaped outer surface 74 and cover the ridge 72. Moreover, the mushroomed-shaped outer surface 74 adds a hump to the outer surface of the ridge 72, thus providing addition textural feel to provide notice to a child that non-edible material is located below an edible coating covering the first and second sections 76,78. Similar to the T configuration, the candy coating preferably only rises to the stem of the mushroom, resulting in the top or hood of the mushroom being above the outer surface of the candy coating. A hook 71 can be formed into the ridge 72 or coupled to the ridge 72 in order to hang the container 70, for example, from a Christmas tree.

Figure 5:
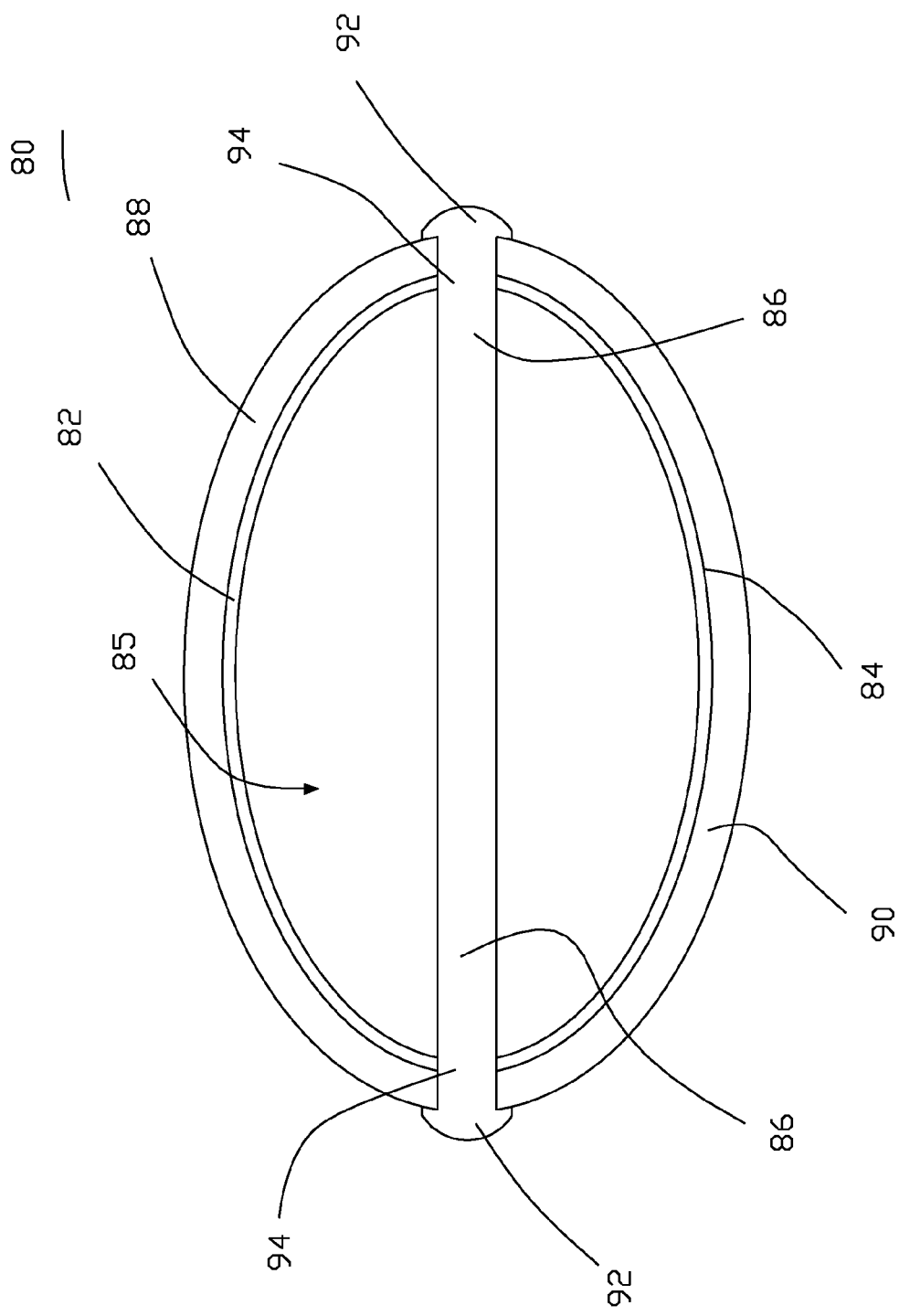
FIG. 5 is a cross-sectional view of a container configured in accordance with another embodiment of the present invention.

FIG. 5 is a cross-sectional view of the container 80 configured in accordance with a further embodiment of the present invention. The container includes a first section 82 and a second section 84 joined at a ridge 86. The container 80 forms an internal area 85 for storing a small toy. Similar to the embodiment shown in FIGS. 1-4, the ridge 86 extends completely around the container 80. An edible coating 88, such as chocolate, covers the first section 82, and an edible coating 90 covers the second section 84. The edible coatings 88,90 are separated by the ridge 86. In accordance with the present invention, the ridge 86 has a curved top 92 with a cross-section similar to a rounded nail head. The edible coating 88,90 preferably only covers the stem 94 of the ridge, but does not come around or over the top of the outer curved surface 92. The curved top 92 functions to prevents the first and second edible coatings 88,90 from crossing the ridge 86 should the edible coatings 88,90 melt in a higher temperature environment. Furthermore, the raised and wider surface area of the curved top 92 provides additional visional and textual notice to a child that a non-edible container is below the edible coatings 88,90.

Figure 6:
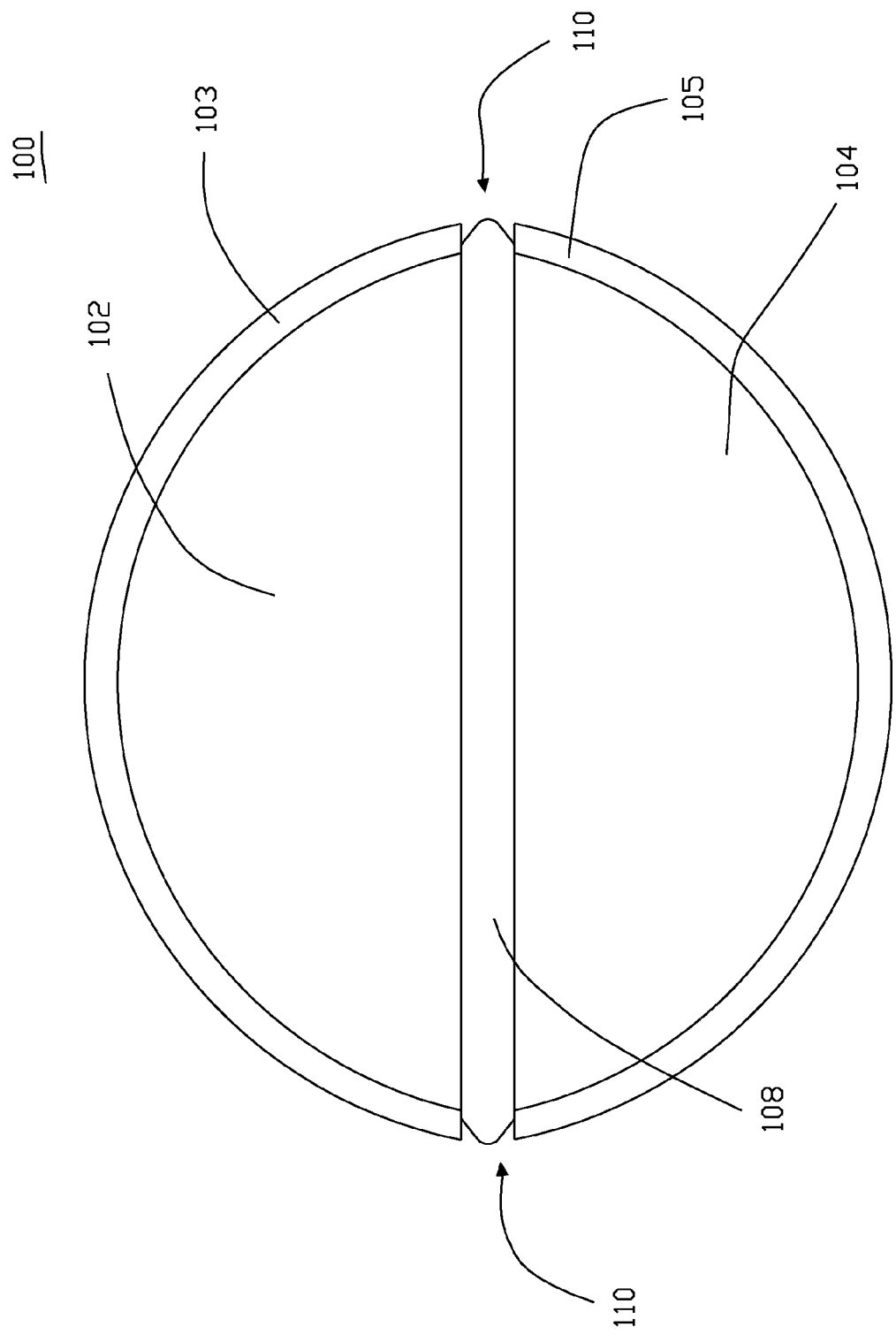
FIG. 6. is a cross-sectional view of a container configured in accordance with the present invention, wherein the surface of the edible coating is level with the outer curved surface of the ridge.

FIG. 6 illustrates a cross-section of a container 100 having first section 102 and second section 104 joined at a ridge 108. The first section 102 has an edible coating 103, and the second section 104 has an edible coating 105. The edible coatings 103,105 are separated by the ridge 108. In accordance with the present invention, the outer curved surface 110 of the ridge 108 is level with the outer surface of the edible coatings 103,105.

Figure 6A:
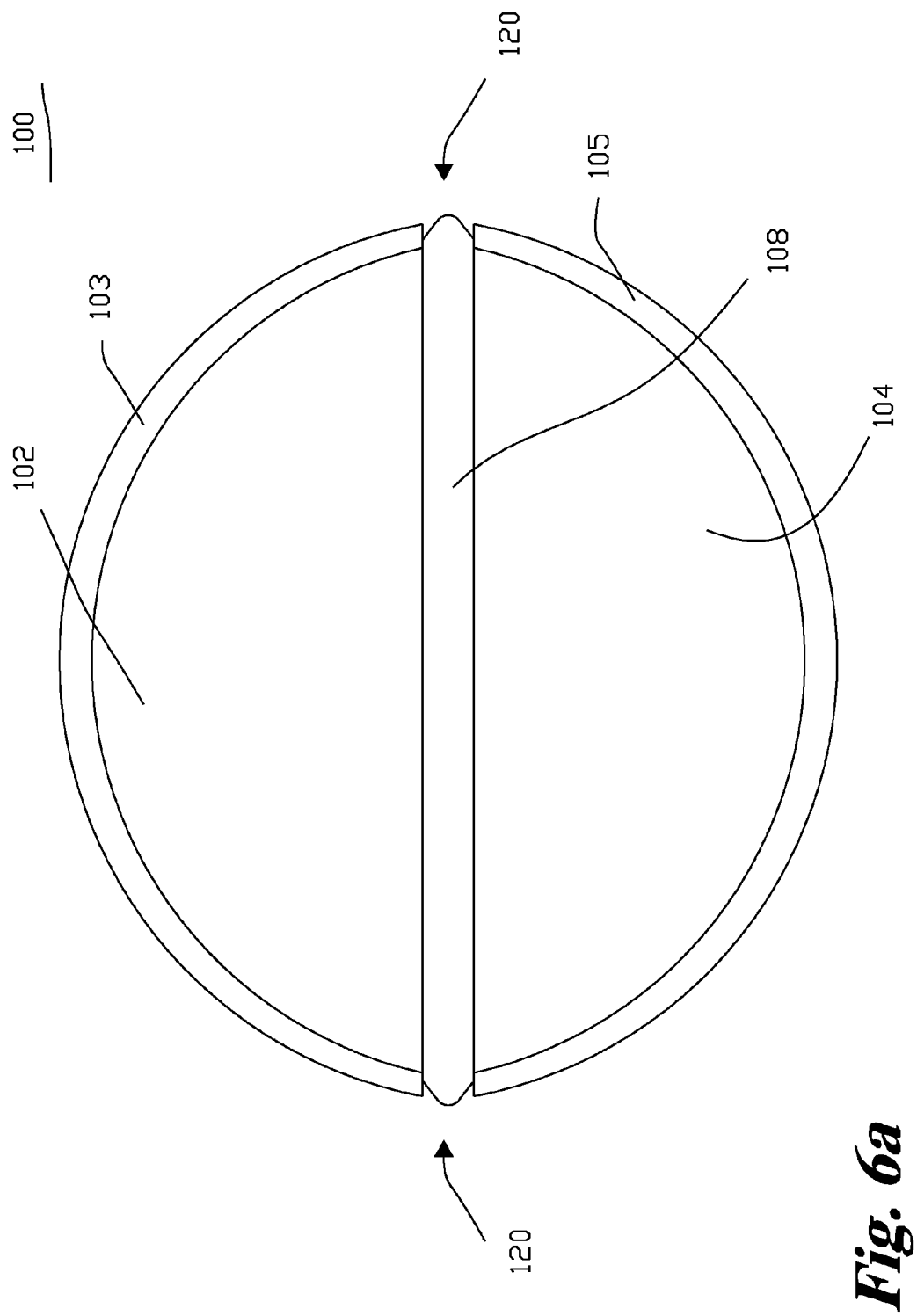
FIG. 6a is cross-sectional view of the container shown in FIG. 6, wherein the outer surface of the edible coating is above the curved surface of the ridge.

FIG. 6a shows the container 100 of FIG. 6, wherein an outer curved surface 120 of the ridge 108, as a design choice, extends beyond the outer surface of the edible coatings 103, 105.

Figure 6B:
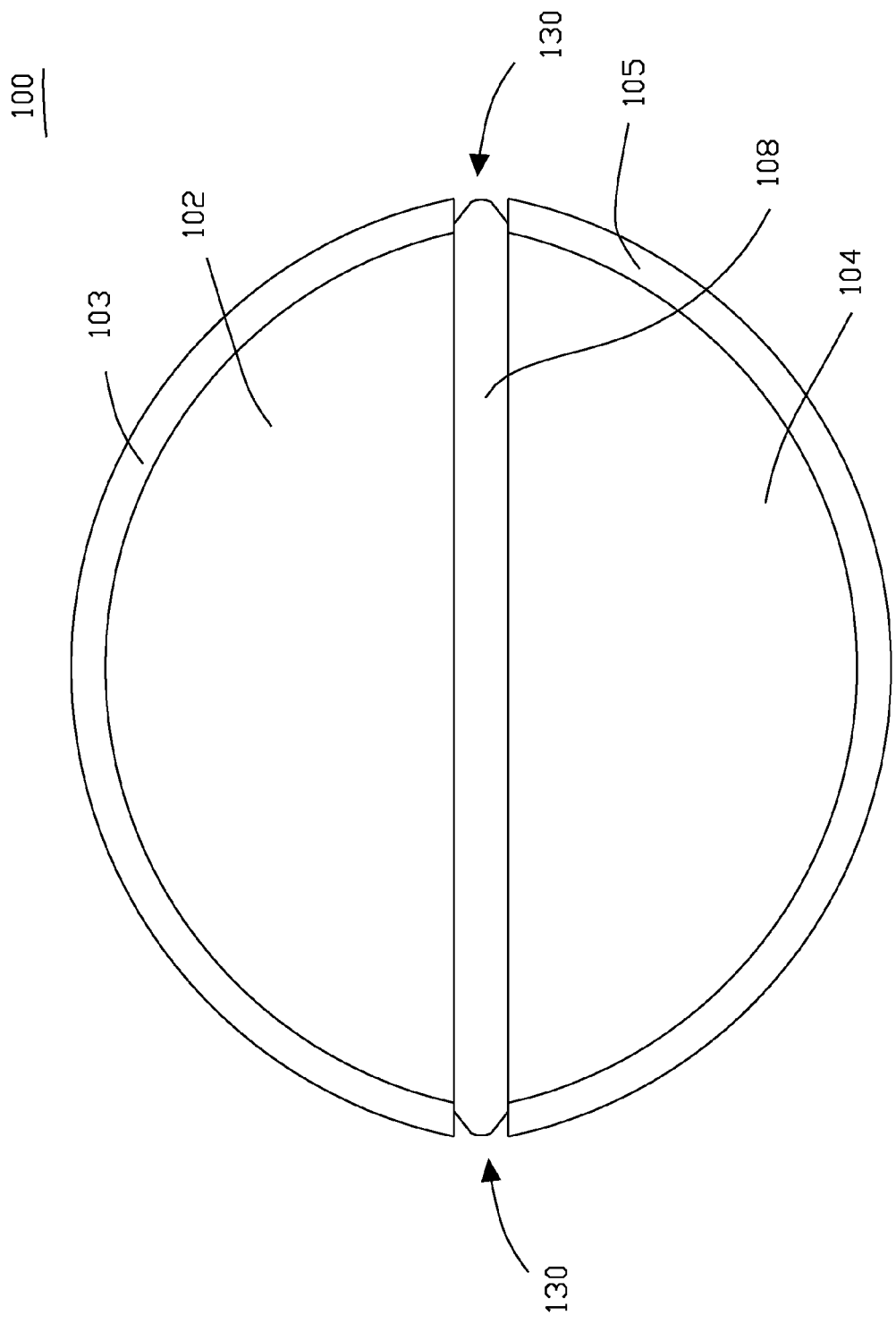
FIG. 6b is a cross-sectional view of the container shown in FIG. 6, wherein the outer surface of the edible coating is below the curved surface of the ridge.

FIG. 6b shows the container 100 of FIG. 6, wherein an outer curved surface 130 of the ridge 108, as a design choice, is below the outer surface of the edible coatings 103,105.

The invention has been given by way of example only, and various other modifications of and/or alterations to the described embodiment may be made by persons skilled in the art without departing from the scope of the invention as specified in the appended claims.

I claim as my invention:

1. A container partially enclosed within edible material, comprising:
   a first section having an opening into a hollow interior;
   a second section having an opening into a hollow interior;
   said first and second sections configured to mate together at their respective openings to form a sealed enclosure;
   a rounded tubular ridge extending along on the outer surface of at least one of the first and second sections, and said ridge having a cross-sectionally curved outer surface;
   a coating of edible material on at least a portion on the outer surface of the first and second sections, wherein an extension area of the ridge positions the cross-sectionally curved outer surface of the ridge beyond the outer surface of the coating of edible material; and
   a wrapper covering the coating of edible material.

2. The container of claim 1, wherein the ridge extends completely around the container.

3. The container of claim 1, wherein the ridge extends in a relatively straight direction.

4. The container of claim 1, wherein the ridge extends perpendicular to the opening of at least one of the first and second sections.

5. The container of claim 1, further comprising:
   an appendage connected to the ridge, said appendage including an aperture for receiving a hook.

6. The container of claim 1, further comprising:
   a hook coupled to the ridge for hanging the container.

7. The container of claim 1, further comprising:
   at least one aperture in the first section providing an air passage from the outer surface into the hollow interior of the first section, the aperture consisting of a fully surrounded hole.

8. The container of claim 1, further comprising:
   at least one aperture in the second section providing an air passage from the outer surface into the hollow interior of the second section, the aperture consisting of a fully surrounded hole.

9. The container of claim 1, wherein at least one of the first and second sections includes a notch in a periphery of at least one of the first and second openings to enable a user to insert a thumbnail for separating the first and second sections when mated together.

10. The container of claim 1, further comprising:
    an external flange extending around the periphery of the opening of the first section; and
    an internal flange extending around the periphery of the opening of the first section, wherein the internal flange is sized to contact and fit inside the external flange during mating of the first and second sections to form a sealed container.

11. The container of claim 1, further comprising:
    an external flange extending around the periphery of the opening of the first section;
    an internal flange extending around the periphery of the opening of the second section, wherein the internal flange is sized to contact and fit inside the external flange during mating of the first and second sections to form a sealed container; and
    at least one aperture passing through the external flange, wherein mating of the first and second sections causing the internal flange to cover and seal the external flange aperture, the aperture consisting of a fully surrounded hole.

12. The container of claim 1, further comprising:
    an external flange extending around the periphery of the opening of the first section;
    an internal flange extending around the periphery of the opening of the second section, wherein the internal flange is sized to contact and fit inside the external flange during mating of the first and second sections to form a sealed container; and
    an aperture passing through the internal flange, wherein mating of the first and second sections causing the external flange to cover and seal the internal flange aperture, the aperture consisting of a fully surrounded hole.

13. The container of claim 1, wherein the ridge extends parallel to at least one of the openings of the first and second sections.

14. The container of claim 1, wherein the ridge extends diagonal to at least one of the openings of the first and second sections.

15. A container partially enclosed within edible material, comprising:
    a first section having an opening into a hollow interior;
    a second section having an opening into a hollow interior;
    said first and second sections configured to mate together at their respective openings to form a sealed enclosure;
    a coating of edible material on at least a portion of the outer surface of the first and second sections; and
    ridge means for keeping the edible coating of the first and second sections separated in the event the coating melts or flows in a higher temperature environment.

* * * * *